(12) United States Patent
Sourioux et al.

(10) Patent No.: US 8,473,137 B2
(45) Date of Patent: Jun. 25, 2013

(54) METHOD FOR MANAGING HYBRID VEHICLE AIR CONDITIONING SYSTEM

(75) Inventors: Thomas Sourioux, Lille (FR); Stephane Rimaux, Meudon (FR)

(73) Assignee: Peugeot Citroen Automobiles SA (FR)

( * ) Notice: Subject to any disclaimer, the term of this patent is extended or adjusted under 35 U.S.C. 154(b) by 4 days.

(21) Appl. No.: 13/384,276

(22) PCT Filed: Jul. 7, 2010

(86) PCT No.: PCT/FR2010/051433
§ 371 (c)(1),
(2), (4) Date: Jan. 16, 2012

(87) PCT Pub. No.: WO2011/007079
PCT Pub. Date: Jan. 20, 2011

(65) Prior Publication Data
US 2012/0123627 A1     May 17, 2012

(30) Foreign Application Priority Data

Jul. 17, 2009   (FR) .................................... 09 54948

(51) Int. Cl.
*B60H 1/00*          (2006.01)
(52) U.S. Cl.
USPC .......................... 701/22; 180/65.28; 903/930
(58) Field of Classification Search
USPC ............. 701/22, 36; 180/65.1, 65.21, 65.275, 180/65.28; 477/7; 903/930
See application file for complete search history.

(56) References Cited

U.S. PATENT DOCUMENTS

| 7,861,547 B2 * | 1/2011 | Major et al. ................. 62/228.1 |
| 2006/0117775 A1 | 6/2006 | Dage et al. |
| 2006/0259219 A1 | 11/2006 | Wakiyama et al. |

FOREIGN PATENT DOCUMENTS

| DE | 19801167 C1 | 4/1999 |
| DE | 102007013459 A1 | 9/2008 |
| WO | 2006057433 A | 6/2006 |
| WO | 2008025916 A | 3/2008 |

OTHER PUBLICATIONS

International Search Report for PCT application PCT/FR2010/051433 mailed Jul. 9, 2010.

* cited by examiner

*Primary Examiner* — Russell Frejd
(74) *Attorney, Agent, or Firm* — Polster, Lieder, Woodruff & Lucchesi, L.C.

(57) ABSTRACT

The invention relates to a method for managing a hybrid vehicle air conditioning system that includes a compressor (8) generating coolness that is storable in a cold reserve (10), the heat engine having access to a control (34) that automatically controls the starting and stopping thereof. Said management method is characterized in that it has the power needed to pull the vehicle (6) and a level of coolness in the cold reserve (10) such that: when the heat engine (2) is on, the stopping (82) thereof is enabled if the charge level (92) in the cold reserve (10) is greater than a minimum threshold and the necessary pulling power is below a maximum threshold, both of said thresholds correlating with each other; and when the heat engine (2) is off, a command for the starting (84) of said heat engine is made if the charge level of the cold reserve (10) is less than a maximum threshold and the necessary pulling power is above a minimum threshold, both of said thresholds also correlating with each other.

9 Claims, 3 Drawing Sheets

METHOD FOR MANAGING HYBRID VEHICLE AIR CONDITIONING SYSTEM

CROSS-REFERENCE TO RELATED APPLICATIONS

This application is the US National stage, under 35 U.S.C. §371, of International App. No. PCT/FR2010/051433 which was filed on Jul. 7, 2010 and claims priority to French Application No. 0954948 which was filed on Jul. 17, 2009.

BACKGROUND OF THE INVENTION

The present invention relates to a method for managing the air conditioning system of a hybrid automotive vehicle, either rechargeable or not, comprising an internal combustion engine and an alternative motor, and a vehicle employing this method.

To provide traction to the vehicle, hybrid vehicles contain in general two different energies which are kept in storage, one of which is reversible the other not, or typically electrical energy and a fuel.

The power connection to the storage device of reversible energy makes it possible either to use the energy contained in this device for applying traction force to the vehicle through the alternative motor, or to use the kinetic energy of the vehicle, in particular during a deceleration, in order to refill this storage device.

The energy of the fuel reservoir is transformed in mechanical energy by an internal combustion engine. The alternative electrical energy is transformed into mechanical energy by at least one electrical machine.

According to the commands of the driver and the driving conditions of the vehicle, the electrical machine can be used for applying a complementary engine torque to the drive wheels, or for recharging the electrical energy storage devices during braking of the vehicle by applying a braking torque to these drive wheels, or for driving with the electrical machine only without emitting polluting gas.

In this way, the operation of the internal combustion engine can be optimized and the fuel consumption reduced. In particular, it is desirable to stop the internal combustion engine when the vehicle stops, for instance at a traffic light, or during sufficiently low power requirements corresponding with low efficiency of the internal combustion engine. In the last case, the electrical machine is exclusively used for providing traction to the vehicle.

In a variant, hybrid vehicles can comprise another energy source, such as compressed air, replacing electricity for the alternative motor.

In general, these hybrid vehicles include a climate control system for the cabin to cool the ambient air, which comprises a compressor driven by the internal combustion engine, and which produces a cycle of evaporation and liquefaction of a coolant.

One of the problems to be solved is that when the internal combustion engine is not running, the compressor is no longer driven and the vehicle is no longer generating cold for the air conditioning. If the engine shut down persists during warm weather, the ambient temperature of the cabin will rise, which could be uncomfortable.

A known climate control system disclosed in French Pat. No. FR2866831 comprises a cold storage device constituting a cold reserve, which is cooled by circulation of a coolant fluid when the internal combustion engine is running. When the vehicle stops, and the internal combustion engine is not running, the cold storage returns this cold in order to continue to cool the cabin of the vehicle.

If the vehicle stop is prolonged, the cold reserve may run out, requiring the restart of the internal combustion engine strictly to provide a source of cold and to maintain the same level of comfort. Since the operation of an internal combustion engine is not optimized at low power, it results in high specific fuel consumption, which is not favorable for reducing consumption and polluting emissions.

BRIEF SUMMARY

The goal of the present invention is to avoid these disadvantages of the prior technology, and to provide a simple and efficient solution for optimizing the management of the charge status of the cold storage, by determining the start and stop times of the internal combustion engine as a function of the driving situation of the vehicle, in order to reduce the fuel consumption of the vehicle.

To this end, a method is disclosed for managing the climate control system of a hybrid vehicle comprising an internal combustion engine and at least one alternative motor for the traction of the vehicle. The climate control system comprises a compressor driven by the internal combustion engine which generates cold that can be stored in a cold storage device. A command unit of the internal combustion engine automatically controls the start or the stop of this engine and the use of the alternative motor. The management method takes into account both the charge level of the cold storage and the driving situation of the vehicle comprising a certain traction power of this vehicle, as follows:

- in a first driving situation in which the internal combustion engine is running, the method includes authorizing an engine stop if the charge level of the cold storage is greater than a minimum threshold and the necessary traction power is below a maximum threshold; the two thresholds being linked by a variation law;
- in a second driving situation in which the internal combustion engine is not running, the method includes requesting an engine start if the charge level of the cold storage is less than a maximum threshold and the necessary traction power is above a minimum threshold; again, the two thresholds being linked by a variation law.

One advantage of this method of managing the internal combustion engine is that, by taking into account the cold level of the cold storage and the power necessary for the traction of the vehicle, the start requests for the internal combustion engine can be reduced to a minimum, and instead the alternative motor can be used when the efficiency of the internal combustion engine is too low.

The method for managing the internal combustion engine according to the invention can in addition comprise one or more of the following characteristics, which may be combined among them.

According to one embodiment, the parameters considered for the driving situation are linked to the vehicle speed and the traction torque of the driving wheels of the vehicle.

According to particular driving situations, which for a given charge level of the cold storage, generate the same result for the authorization to stop or the request to start the internal combustion engine, correspond for a large extent with constant power.

According to one version, in a graph comprising two axes representing the vehicle speed and the traction torque, the curves comprising the operating points generating the same result comprise parts with straight extremities which connect with the speed or torque axis.

These curves can move, according to a median direction between the two axes, upward when the charge level of the cold storage increases, and downward when the charge level decreases.

Advantageously, for the same driving situation representing a specific speed and traction torque, the authorization to stop the internal combustion engine is given at a charge level of the cold storage which is higher than the charge level necessary for requesting the start of the engine in order to create hysteresis between the zone requesting the start and the zone authorizing the stop of the internal combustion engine.

According to one implementation mode, in case the cold storage is practically empty, the start of the internal combustion engine is requested systematically regardless of the torque needed for traction of the vehicle.

The invention also relates to a hybrid vehicle having a method for managing a climate control system comprising a compressor which is driven by the internal combustion engine providing traction to the vehicle, and which generates cold that can be stored in a cold storage. The internal combustion engine includes of a command unit which automatically controls the start or stop of the internal combustion engine, allowing instead for the use of an alternative motor. This management method comprises in addition any of the preceding characteristics.

According to one embodiment, the hybrid vehicle comprises an alternative motor comprising an electrical machine supplied by electrical accumulators.

BRIEF DESCRIPTION OF THE SEVERAL VIEWS OF THE DRAWINGS

The invention will be better understood and other characteristics and advantages will become clear by reading the following description, given as an example, with reference to the attached drawings in which.

DETAILED DESCRIPTION

In the following, we are describing a hybrid vehicle comprising an electrical machine, knowing that the method according to the invention can be applied equally well to a hybrid vehicle comprising several electrical machines, or any other type of alternative energy.

Figure 1:
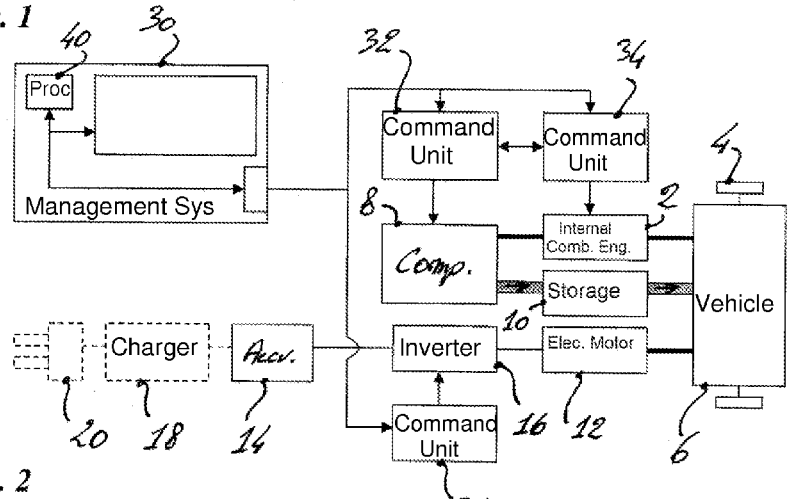
FIG. 1 is a diagram representing the motors and the climate control system of a hybrid vehicle comprising a method for controlling the starting and stopping of an internal combustion engine.

FIG. 1 schematically shows a vehicle 6 comprising an internal combustion engine 2 suitable for driving the traction wheels 4. An electrical machine 12, comprising a second motor equally suitable for driving the traction wheels 4 of vehicle 6, is supplied by electrical accumulators 14 that deliver a current to an inverter 16, which formats this current appropriately.

The electrical machine 12 produces electrical energy which is stored in the electrical accumulators 14, specifically during the braking of the vehicle in order to recuperate energy. In addition, the electrical accumulators 14 are recharged by a charger 18 which can be installed onboard, and which can be connected to the grid by means of connector 20.

The internal combustion engine 2 drives a climate control compressor 8. The compressor compresses a fluid which flows in a circuit according to a cycle comprising liquefaction, then evaporation, thus producing cold which is supplied to the climate control system of the vehicle 6. The climate control compressor 8 also supplies a cold storage 10, which accumulates this cold in order to return it later to the climate control system of the vehicle.

A management system 30 comprises a processor 40 which has various information relative to the operation of the vehicle, and which includes memorized data constituting the control strategy. The management system is connected to a command unit 32 for the compressor 8, a command unit 34 for the internal combustion engine 2, and a command unit 36 for the electrical machine 12 in order to optimize their operation.

In particular, the control strategies of the management system 30 act on the command unit 34 of internal combustion engine to modify the start or stop orders of the internal combustion engine as a function of the status of the climate control system and the value of the parameters representing the driving situation of the vehicle, such as speed or acceleration, which depend on the commands of the driver.

Figure 2:
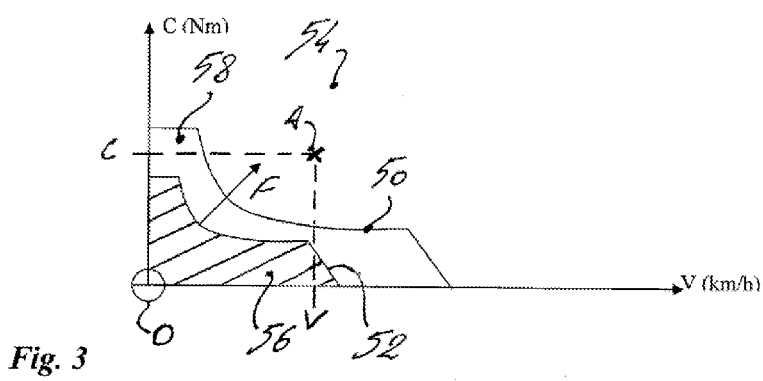
FIGS. 2 and 3 are for a first example and show graphs representing a function of the vehicle speed and the torque of the driving wheels, wherein in the first graph (FIG. 2), the zone in which the stop of the internal combustion engine is authorized, and wherein in the second graph (FIG. 3), the zone in which the start of the internal combustion engine is requested.
Figure 3:
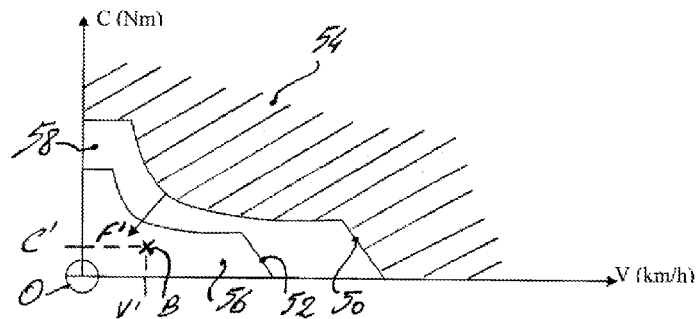

FIGS. 2 and 3 are for a first example using two parameters representative of the driving situation of the vehicle. The graphs have two axes indicating the vehicle speed V and the torque C of the traction wheels. It is noted that the product of the speed and torque represents the motor power necessary to move the vehicle 6, according to the commands of the driver.

An upper curve 50 and a lower curve 52 represent, for a specific charge level of the cold storage 10, the limits within which the management system 30 intervenes with the command unit 34 of the internal combustion engine, in order to modify the run or stop status of the internal combustion engine.

Each curve 50, 52 contains a central part where the product of torque C and speed V is practically constant, which corresponds to a constant power level. The curves 50 and 52 also comprise straight extremity parts, parallel to the speed axis V and torque axis C, connecting directly with these axes.

The upper curve 50 defines a high zone 54 corresponding to a request to start the internal combustion engine 2, and the lower curve 52 defines a low zone 56 where the stop of the internal combustion engine is authorized. Between the two offset curves 52, 54 forming one pair, is an intermediate zone 58, defining the hysteresis between the area forcing the start of the internal combustion engine and the area authorizing the stop of the internal combustion engine, which is necessary to avoid instability between the two operating modes of the method.

Each pair of curves 50, 52 is valid for a specific charge level of the cold storage 10. The curves 50, 52 move, according a median direction between the two axes V and C, upward in the direction of arrow F when the charge level of the cold storage increases, and downward in the direction of arrow F' when the level of the cold storage decreases.

The curves 50, 52 represent power thresholds for the traction of the vehicle to which is linked, through a certain correspondence or law of variation, another threshold for the charge level of the cold storage 10.

The method for managing the climate control system works as follows.

When the vehicle 6 operates at point A shown in FIG. 2, corresponding to a command from the driver for torque C and speed V, the internal combustion engine 2 runs and supplies at the same time the necessary power for the traction of the vehicle, and for driving the compressor 8 which provides the air conditioning to the cabin, while recharging the cold storage 10.

As the charge level of the cold storage 10 increases, curves 50, 52 move upward in the direction of arrow F as a function of the variation law. When the lower crosshatched area 56, authorizing the stop of the internal combustion engine 2, reaches the operating point A, this point enters in this lower area and the management system 30 supplies to the command device 34 an authorization to stop the internal combustion engine.

It is then assumed that the charge level of the cold storage 10 is sufficiently high, and the power necessary for the traction of the vehicle sufficiently low, so that running of the internal combustion engine 2 is not required to perform this charge. The command unit 34 of the engine decides then whether to stop the internal combustion engine and to switch to electrical traction 12, supplied by the electrical accumulators 14, in case that this operating mode is more energy efficient.

Cold is then taken from the cold storage 10 and supplied to the climate control system.

When the vehicle 6 operates at point B shown in FIG. 3, corresponding with another command from the driver for torque C' and speed V', the internal combustion engine 2 is not running. The traction of vehicle 6 is ensured by the electrical machine 12 which draws energy from the electrical accumulators 14, and the cold supplied to the climate control system is taken from the cold storage 10.

Since the charge level of the cold storage 10 is diminishing, curves 50, 52 move downward in the direction of the arrow F' as a function of the variation law. When the upper crosshatched area 54, requesting the start of the internal combustion engine 2, reaches the operating point B, this point enters the upper part, and the management system 30 sends to the command unit 34 of internal combustion engine 2 an order to start the engine.

It is then assumed that the charge level of the cold storage 10 is insufficient, and that the power necessary for the traction of the vehicle is high, so that to achieve a more favorable energetic balance of the vehicle, the internal combustion engine 2 is restarted in order to ensure both the traction and the recharge of the cold storage 10.

The origin point O of the axes corresponds with the displacement position of curves 50, 52 in the case that the cold storage 10 is practically empty. In this case, we move inevitably in the upper crosshatched area 54 requesting the start of internal combustion engine 2, regardless of the torque needed for traction of the vehicle, and the internal combustion engine is restarted to recharge the cold storage 10.

Figure 4:
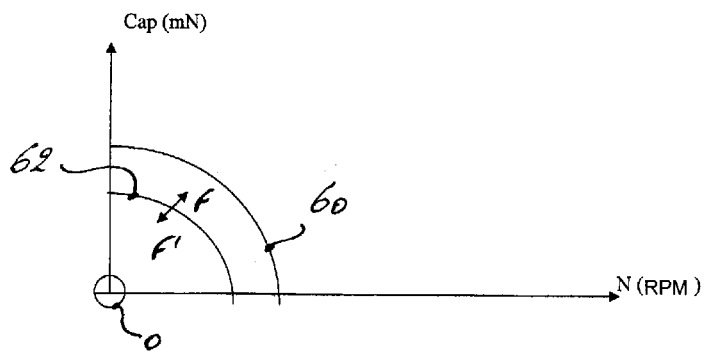
FIG. 4 is for a second example, and shows a graph representing in function of the rotational speed of the transmission input shaft and the torque applied to this input shaft, the zone in which the stop of the internal combustion engine is authorized, and the zone in which the start of the internal combustion engine is requested.

FIG. 4 is for a second example using two other parameters representative of the driving situation of the vehicle. The graph comprises two axes indicating the rotational speed N of the transmission input shaft, and the torque Cap applied to this input shaft. To be noted that the product of speed N and torque Cap represents also the motor power necessary to displace the vehicle 6 according to the commands of the driver.

As in the example above, the upper curve 60 and the lower curve 62, also represent, for a specific charge level of the cold storage 10, limits within which the management system 30 intervenes with the command device 34 of the internal combustion engine, in order to modify its run or stop status.

Each pair of curves 60, 62 is valid for a specific charge level of the cold storage 10, and moves as a function of the variation law. Curves 60, 62 move in the same manner according to a median direction between the two axes N and Cap, upward in direction of arrow F when the charge level of the cold storage 10 increases, and downward in direction of arrow F' when the level decreases.

To be noted that in this example, the general shape of upper curve 60 and lower curve 62 have the general appearance of a circle arc, centered around point O.

Figure 5:
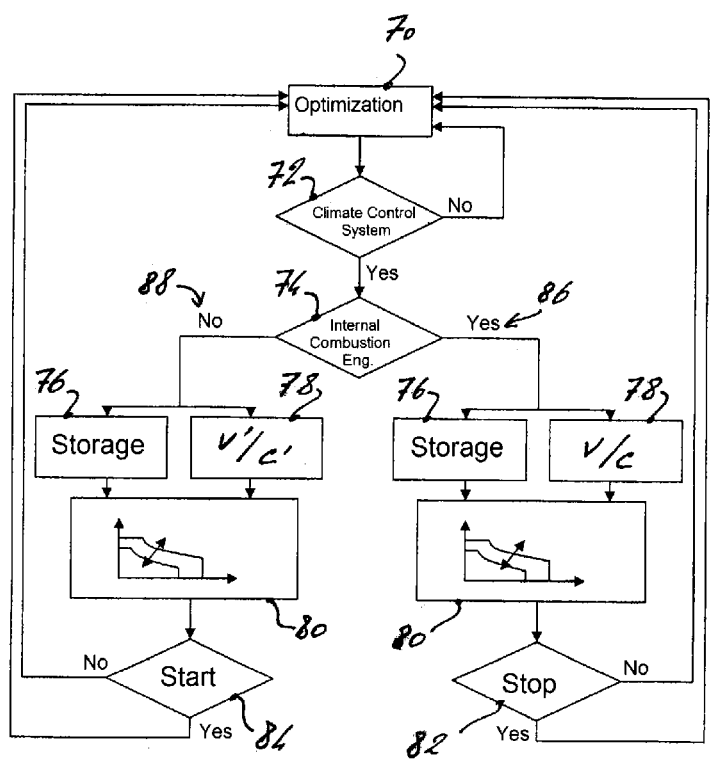
FIG. 5 is a flow chart for managing starts and stops of the internal combustion engine.

The flow chart shown in FIG. 5, employed by the management system 30, uses the values V of the vehicle speed and C of the torque at the traction wheels.

The decision graph comprises an optimization function 70 linked to the command unit of the internal combustion engine, which verifies whether the climate control system of the vehicle is activated 72. In the positive case, it verifies then whether the internal combustion engine is running.

In case the internal combustion engine is determined to be running, as at 86, the configuration shown in FIG. 2 applies. The management system verifies at 76 the charge level of the cold storage and verifies at 78 the values of the torque C at the traction wheels and vehicle speed V, in order to compare them at 80 with the positions of curves established for this operating point, as a function of the variation law.

The result of this comparison can lead to an authorization at 82, to stop the internal combustion engine, which is transmitted to the optimization function 70 in order to be sent to the engine command unit.

In case the internal combustion engine is determined to be stopped, as at 88, the configuration shown in FIG. 3 applies. The management system verifies at 76 the charge level of the cold storage, and verifies at 78 the values of the torque C' at the traction wheels and vehicle speed V', in order to compare them at 80 to the positions of curves established for this operating point.

The result of this comparison can lead to a request 84 to start the internal combustion engine, which is transmitted to the optimization function 70 in order to be sent to the command unit of the internal combustion engine.

In view of the method according to the invention, the choice of the energy source, the internal combustion engine or the electrical machine, can be optimized in order to reduce non-renewable energy consumption and polluting emissions while maintaining the same comfort level because the climate control system of the vehicle remains active without interruption.

Indeed, the greatest advantage is at the moment in which the power necessary for the traction of the vehicle is rather high in order to recharge the cold storage with is sufficiently low, ensuring traction with the internal combustion engine which leads to fuel efficiency in this operating mode.

The high level charge of the cold storage, constituted in this way, is then used for the moments where the power necessary for the traction of the vehicle is rather low, avoiding the restart of the internal combustion engine by drawing cold from the cold storage. The traction of the vehicle is then ensured by electrical energy, avoiding the use of the internal combustion engine with poor efficiency in this operating point.

Figure 6:
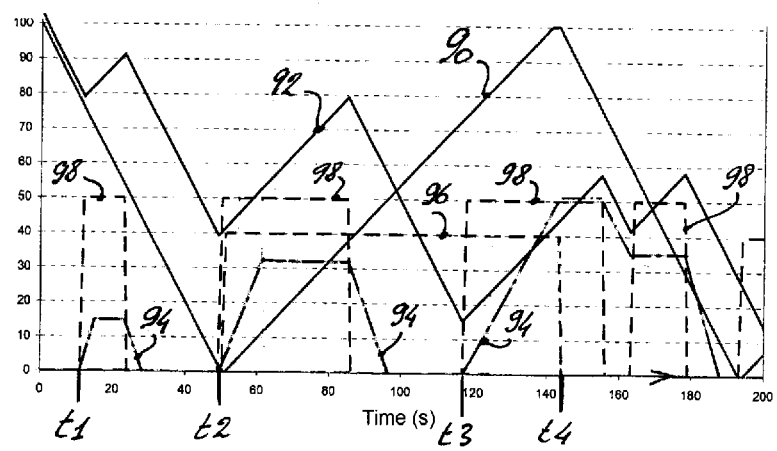
FIG. 6 is a graph showing, for an operating cycle as a function of time, the charge level of the cold storage with a management method according to the current state of technology, and with the method according to the invention.

FIG. 6 is a graph showing, for an operating cycle as a function of time, the charge status of the cold storage device 90 with a management method according to the current state of technology, and the charge status 92 with the method described above.

The speed of the vehicle is shown by the curve 94, and comprises three successive starts at times t1, t2 and t3, with wait times between two starts in which the climate control system must remain active.

For the management method according to the current state of technology, there is a wait until the charge level of the cold storage device 90 descends to 0, in order to recharge it at time t2. In this example, this time t2 corresponds in fortuitous manner with a restart of vehicle 94, and therefore of the internal combustion engine, as shown in curve 96.

The internal combustion engine is then kept running 96, independently of the power necessary for the traction of the vehicle, until time t4 when the charge of the cold storage 90 is maximum. Only at this moment, the internal combustion engine is stopped to use instead the electrical motor for traction of the vehicle.

The management method, is using at time t1 a sufficiently high power demand for the traction of the vehicle, while the charge level of the cold storage 92 is sufficiently low, to start the internal combustion engine, and at the same time recharge the cold storage. The same occurs at times t2 and t3, when the vehicle starts.

This method of managing the internal combustion engine is simple to implement, and can be integrated in an economical manner in an existing processor, in particular the processor controlling the climate control system of the vehicle, or the processor controlling the engine.

In a variant, this management method can be applied in hybrid vehicles comprising other alternative sources of energy, such as for instance compressed air.

The invention claimed is:

1. A method for managing the climate control system of a hybrid vehicle, comprising an internal combustion engine and at least one alternative motor for the traction of the vehicle, the climate control system comprising a compressor which is driven by the internal combustion engine and which generates cold that can be stored in a cold storage, and a command unit of the internal combustion engine which controls automatically the start of the internal combustion engine, or the stop of the internal combustion engine and to use instead the alternative motor, wherein the management method takes into account both the charge level of the cold storage, and the driving situation of the vehicle comprising a certain traction power of the vehicle, the method comprising:

in a first driving situation where the internal combustion engine is running, authorizing the stop of the internal combustion engine if the charge level of the cold storage is greater than a minimum threshold and the necessary traction power is below a maximum threshold, these two thresholds being linked by a variation law; and in a second driving situation where the internal combustion engine is not running, requesting the start of the internal combustion engine if the charge level of the cold storage is lower than a maximum threshold and the necessary traction power is above a minimum threshold, these two thresholds also being linked by a variation law.

2. The management method according to claim 1, wherein the parameters taken into account for the driving situation are linked to the speed (V) of the vehicle and the traction torque (C) of the driving wheels of the vehicle.

3. The management method according to claim 2, wherein the driving situations which generate, for a given charge level of the cold storage, the same result relative to the authorization to stop or the request to start the internal combustion engine substantially corresponds to constant power.

4. The management method according to claim 3, wherein in a graph comprising two axes representing the speed (V) of the vehicle and the traction torque (C), upper and lower curves comprising the operating points generating the same result, comprise straight extremity portions connecting with the speed or torque axis.

5. The management method according to claim 4, wherein the upper and lower curves move according to a median direction between the two axes (V, C) the curves moving upward when the charge level of the cold storage increases and downward when charge level of the cold storage decreases.

6. The management method according to claim 1, wherein for a same driving situation representing a speed (V) and a traction torque (C), the authorization to stop the internal combustion engine will be issued at a charge level of the cold storage which is higher than the charge level necessary for the request to start the internal combustion engine, in order to create hysteresis between the zone requesting the start and the zone authorizing the stop of the internal combustion engine.

7. The management method according to claim 1 wherein, if the cold storage is almost empty, the start of the internal combustion engine is systematically requested regardless of the torque needed for traction of the vehicle.

8. A hybrid vehicle having a method for managing a climate control system of the vehicle, the climate control system comprising a compressor, driven by an internal combustion engine providing traction to the vehicle the climate control system generating cold which can be stored in a cold storage the internal combustion engine having a command unit which automatically controls the start or stop of the internal combustion engine allowing instead the use of an alternative motor, wherein, the management method is implemented according to claim 1.

9. The hybrid vehicle according to claim 8, wherein the alternative motor comprises an electrical machine supplied by electrical accumulators.

* * * * *